United States Patent [19]
Awsienko

[11] Patent Number: 6,028,807
[45] Date of Patent: Feb. 22, 2000

[54] MEMORY ARCHITECTURE

[75] Inventor: Oleg Awsienko, Phoenix, Ariz.

[73] Assignee: Intel Corporation, Santa Clara, Calif.

[21] Appl. No.: 09/110,704

[22] Filed: Jul. 7, 1998

[51] Int. Cl.[7] ................................................. G11C 13/00
[52] U.S. Cl. .............................. 365/230.02; 365/230.03
[58] Field of Search ........................... 365/45, 230.01, 365/230.02, 230.03, 189.02

[56] References Cited

U.S. PATENT DOCUMENTS

4,780,855 10/1988 Iida et al. ........................... 365/230.01
5,499,216 3/1996 Yamamoto ......................... 365/230.03

*Primary Examiner*—Terrell W. Fears
*Attorney, Agent, or Firm*—Trop, Pruner, Hu & Miles, P.C.

[57] ABSTRACT

A system includes memory banks and a circuit. The memory banks store data that is indicative of a pixel image, and the image includes lines of pixels. For each pair of adjacent lines, the circuit stores a first subset of the data (that is indicative of one line of the pair) in one of the memory banks and stores a second subset of the data (that is indicative of the other line of the pair) in another of the memory banks.

28 Claims, 10 Drawing Sheets

MEMORY ARCHITECTURE

BACKGROUND

The invention relates to a memory architecture.

A digital image may be processed by a digital imaging system to, as examples, enhance the image or compress the amount of data that is associated with the image. Unfortunately, the processing may include numerous memory interactions which may consume a considerable amount of time and thus, depending on the application, may reduce the benefits of the processing. For example, a digital imaging system may compress data associated with a digital image to reduce the amount of redundant and/or nonessential information. This compression may be beneficial, for example, for purposes of transmitting the data, as a smaller amount of data may be transmitted more quickly. For a digital camera, the compression may also be beneficial, for example, for purposes of storing the data in a flash memory of the camera, as more frames may be stored in the memory. However, the compression may itself consume a considerable amount of time which reduces the benefits gained by the compression.

Figure 1:
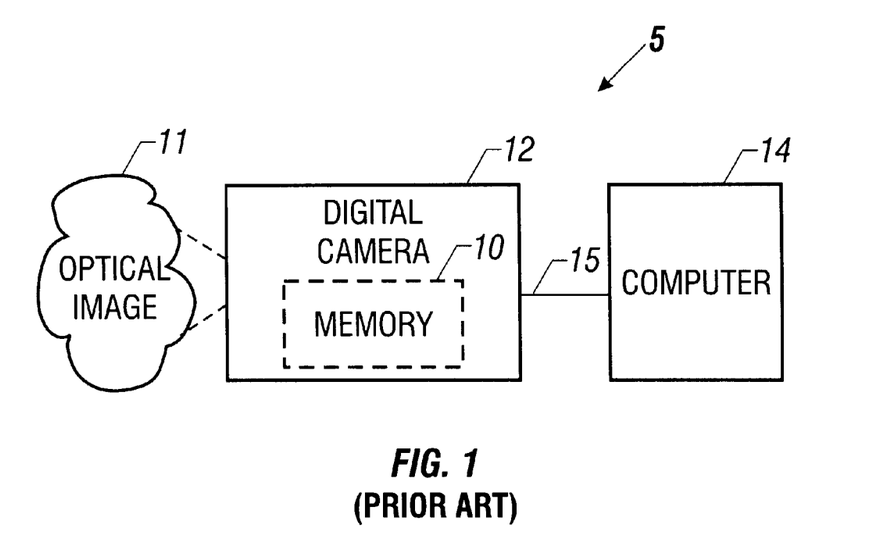
FIG. 1 is a block diagram of a digital imaging system of the prior art.

For example, referring to FIG. 1, a digital imaging system 5 may include a digital camera 12 that electrically captures a digitized representation (called a pixel image) of an optical image 11. The pixel image typically is represented by a frame of data that is initially stored in a memory 10 of the camera 12, and portions, or pixels, of the image are represented by one or more bytes of the frame. Although the camera 12 may transmit (via a serial bus 15, for example) the original, uncompressed frame to a computer 14 (for further processing and for displaying the pixel image, as examples), the camera 12 might compress the frame before transmission. However, the time required to compress the frame adds to the camera's total image processing time and thus, may affect the maximum speed at which the camera 12 takes successive snapshots.

The camera 12 could possibly use either a one-dimensional (1-D) or a two-dimensional (2-D) frame-based compression technique to compress the frame. In 1-D compression, the camera 12 might operate on the original pixel image in either a horizontal or a vertical direction. In this manner, the camera 12 either operates in a vertical direction along the pixel image in row order to compress the data associated with each row of the image or operates in a horizontal direction along the pixel image in column order to compress the data associated with each column of the pixel image. However, to obtain a better compression ratio, the camera 12 might use the 2-D compression, a technique which typically consumes substantially more time, as described below.

Wavelet compression may use 2-D compression. In this manner, the original pixel image is initially transformed into smaller spatial frequency sub-band images, each of which represent the pixel image after being spatially filtered, as described below. The data that indicates the frequency sub-band images is compressed to form the compressed frame.

The transformation of the original pixel image into the frequency sub-band images typically includes spatially filtering the original pixel image in both the vertical and horizontal directions. For example, referring to FIG. 2, to generate four frequency sub-band images 19 (each having a resolution of 640 columns by 480 rows, for example), an original pixel image 18 (having a resolution of 1280 columns by 960 rows, for example) is processed along a vertical direction of the pixel image in row order. In this processing, both high spatial frequency transitions and low spatial frequency transitions are filtered out to produce two intermediate sub-band images 18a and 18b (each having a resolution of 1280 rows by 480 columns): one image 18a formed from the low pass filtering and the other image 18b formed from the high pass filtering. The intermediate sub-band images 18a and 18b, in turn, are processed along a horizontal direction of the pixel image in column order. In this processing, both low and high spatial frequency transitions are filtered out to produce the four frequency sub-band images 19a, 19b, 19c and 19d.

Figure 2:
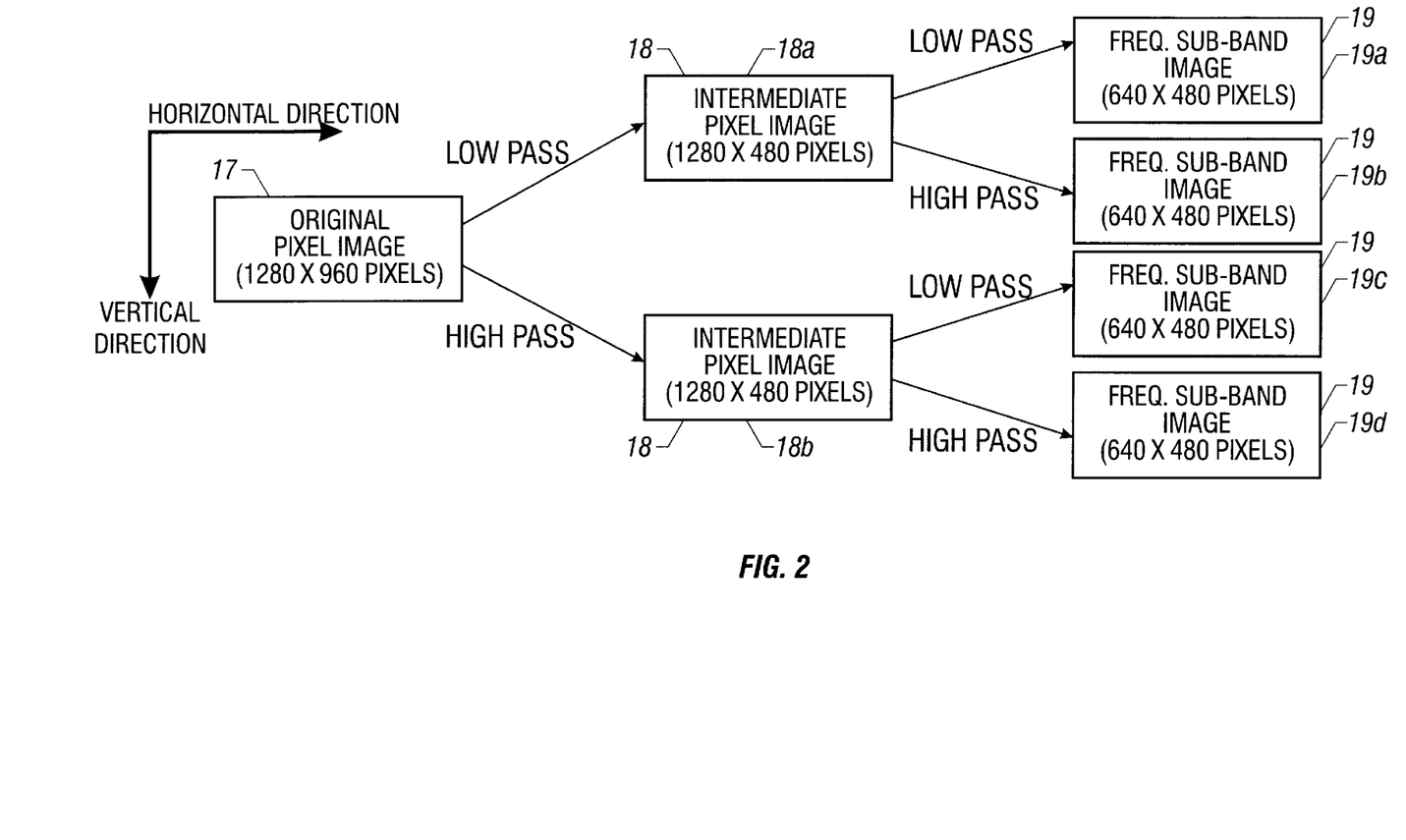
FIG. 2 is a schematic diagram illustrating the generation of frequency sub-band images.

The sub-band image 19a may be denoted an "LH" sub-band image, where the "L" denotes low pass filtering along the vertical direction, and the "H" denotes high pass filtering along the horizontal direction. Similarly, the images 19b, 19c and 19d may be denoted by the letters, HL (to indicate high pass filtering along the vertical direction and low pass filtering along the horizontal direction, for example), HH and LL, respectively. The data associated with each frequency sub-band image 19 is compressed to form the resultant compressed frame.

Thus, because 2-D compression operates along both the horizontal and vertical directions of the image, 2-D compression typically requires substantially more interactions with a memory and thus, typically consumes more clock cycles than 1-D compression. As a result, although 2-D compression generally produces a better compression ratio, 2-D compression may require substantially more time. Because slow compression times may minimize the snapshot-to-snapshot performance of the camera, digital cameras typically do not use 2-D compression.

Thus, there is a continuing need for a digital imaging system that reduces the time required for two-dimensional processes.

SUMMARY

In one embodiment, a system includes memory banks and a circuit. The memory banks store data that is indicative of a pixel image, and the image includes lines of pixels. For each pair of adjacent lines, the circuit stores a first subset of the data (that is indicative of one line of the pair) in one of the memory banks and stores a second subset of the data (that is indicative of the other line of the pair) in another of the memory banks.

DETAILED DESCRIPTION

Figure 3:
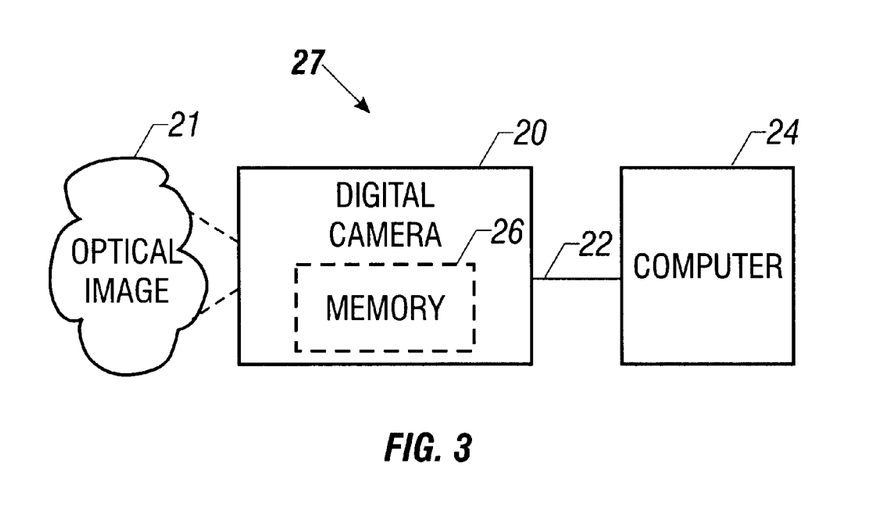
FIG. 3 is a block diagram of a digital imaging system according to one embodiment of the invention.

Referring to FIG. 3, an embodiment 27 of a digital imaging system in accordance with the invention includes a digital camera 20 which may electrically capture a pixel image (of an optical image 21) to form a frame of digital data which indicates the pixel image. Before transmitting the frame to a computer 24, the camera 20 may perform a two-dimensional (2-D) compression technique to reduce the size of the frame.

Figure 4:
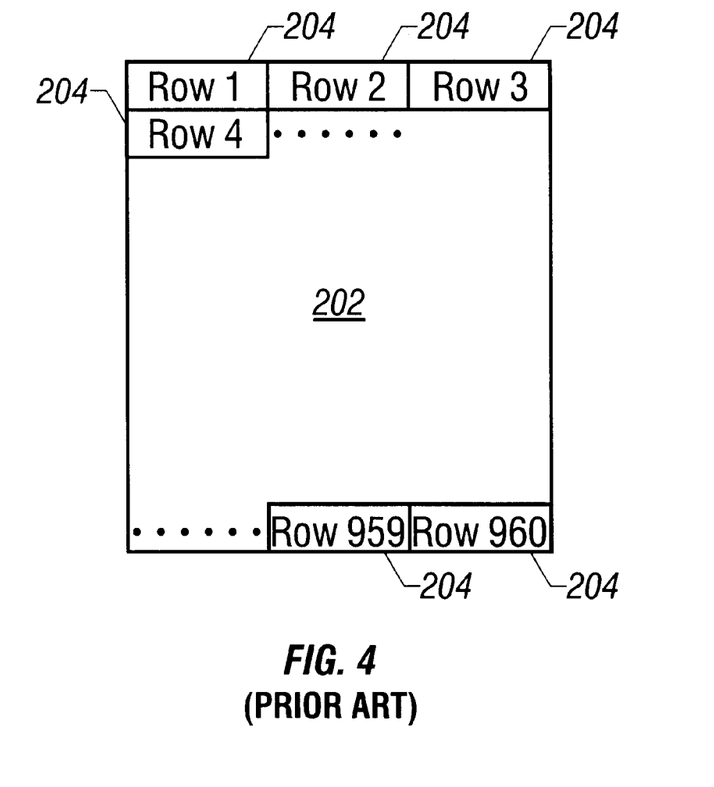
FIG. 4 is an illustration of a memory architecture of the prior art.

The system 27 is unlike a conventional digital imaging system that stores frames (the original frame and subsequently compressed versions of the frame, as examples) in a memory 202 (see FIG. 4) in a linear organization that is optimized for one-dimensional (1-D) processing. For example, if the conventional system stores the data associated with each row of the pixel image in a block 204, then the blocks 204 might successively follow each other in the memory 202. By storing data in this manner, the conventional system may expedite row operations by using techniques (burst transfers, for example) to transfer the blocks 204 into and out of the memory 202 using a minimal number of clock cycles. However, the data that is associated with the columns of the image are scattered throughout the memory 202 in an organization that does not facilitate the use of techniques that reduce the number of clock cycles used in accessing the memory 202. As a result, the memory architecture of the conventional system does not expedite image processing in two dimensions.

Referring to FIG. 3, unlike the memory architecture of conventional digital imaging systems, the camera 20 may store (and retrieve) frames of data in a two-dimensional (2-D) array of memory locations. The array is located in a 2-D memory space 30 (of an internal memory 26), and the locations of the array are arranged in an interleaved organization (described below) which allows the camera 20 to use techniques that minimize the number of clock cycles needed to access the memory 26 for both column and row operations. In particular, in some embodiments, the organization of the of the array optimizes the uses of both memory interleaving and burst transfers. These two techniques generally decrease the number of required clock cycles and thus, minimize the time required to perform 2-D image processing operations, such as compression routines that operate on both the rows and columns of the image.

The advantages of reducing memory access times for 2-D image processing operations may include one or more of the following: memory access times may be minimized; digital processing speed may be enhanced; compression times may be minimized; and when used in a digital camera, the click-to-click (i.e., snapshot to successive snapshot) speed of the camera may be maximized.

In the course of a 2-D processing operation, the 2-D memory space may store several frames of data. For example, for 2-D compression, the memory 30 may initially store a frame that indicates the original pixel image and subsequently store frames that indicate frequency sub-band images. During the compression, the camera 20 may read and write to the 2-D memory space 30 to process these frames.

Figure 6:
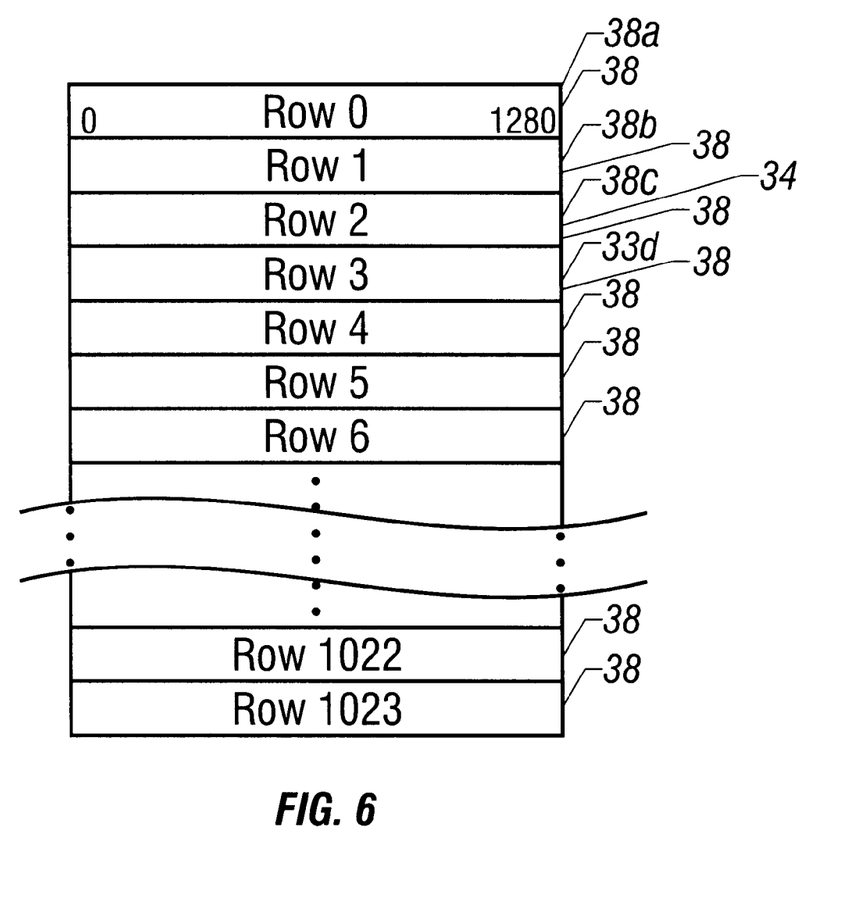
FIG. 6 is an illustration of an exemplary frame of data.

The data for an exemplary frame 34 (see FIG. 6) might include data blocks 38, each of which indicate pixels for a specific row (a horizontal line of 1280 pixels, for example), of the image. The data of the block 38 may be ordered in the same sequence as the pixels of the row. For example, the first byte of data in the block 38 may indicate the first pixel in the row, and the last byte of data in the block 38 may indicate the pixel in the last column (column 1280, for example) of the row.

Figure 7:
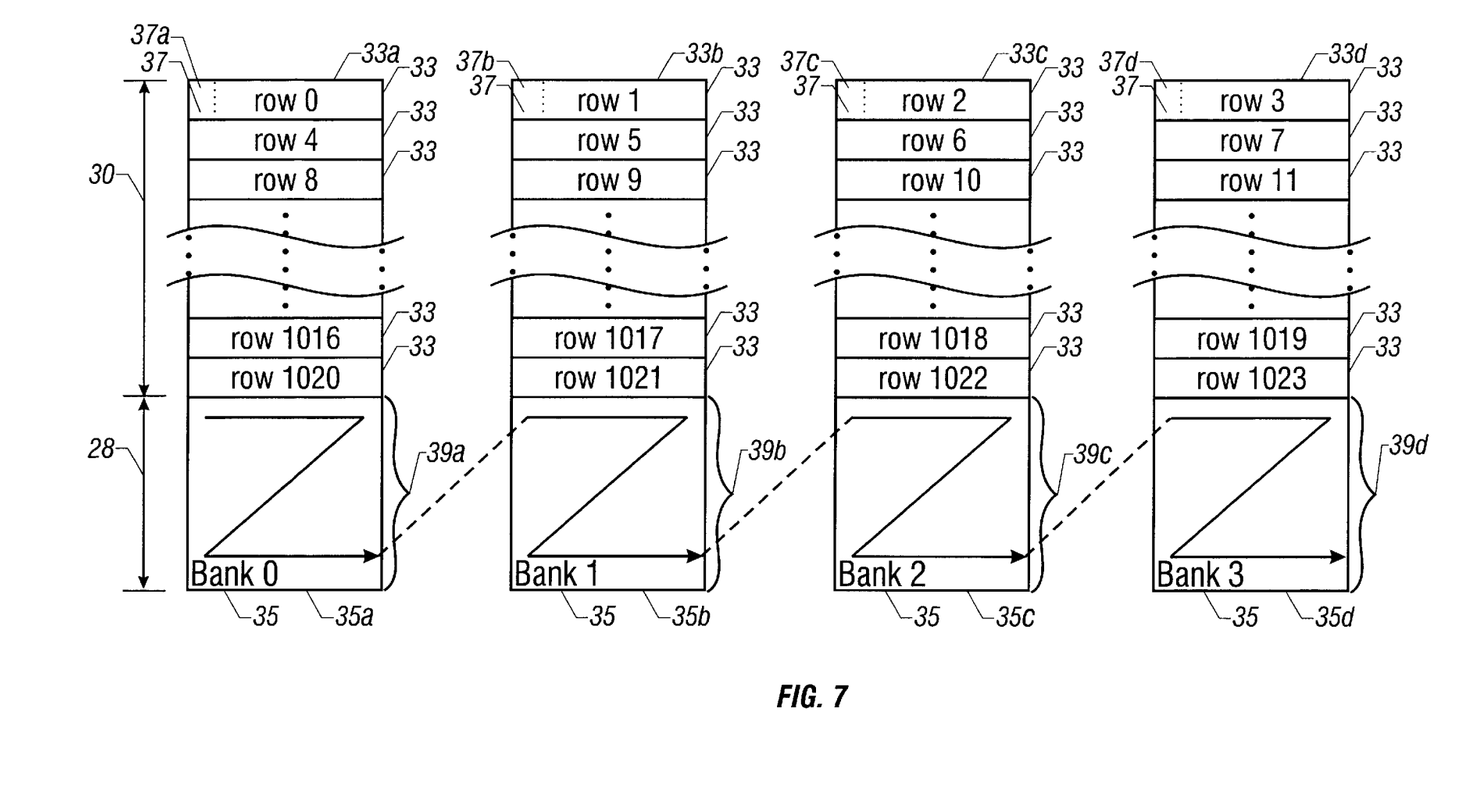
FIGS. 7, 11 and 12 are illustrations of organizations of the memory.

Referring to FIG. 7, in the 2-D memory space 30, each different block 38 is stored in a different contiguous region 33 of the memory 26. The locations of the regions 33 are not determined by the size of the blocks 38, but rather, the regions 33 are situated at predefined locations. Thus, although the size of the block 38 may vary with the size (in pixels) of the pixel row, the locations of the regions 33 do not. As described below, due to the selective placement of the regions 33 and the continuity of each region 33, techniques may be used to enhance memory access times for 2-D operations.

As an example of the selective placement of the regions 33, in some embodiments, the regions 33 may be interleaved between four memory banks 35 (banks 35a, 35b, 35c and 35d, as examples) so that each bank 35 stores a block 38 for every fourth row of the pixel image. As examples, blocks 38a, 38b, 38c and 38d (which indicate pixel rows 0, 1, 2, and 3, respectively) may be stored in banks 35a, 35b, 35c and 35d, respectively. Bank 35a stores data for rows 0, 4, 8, 12, 16 . . . 1020; bank 35b stores data for rows 1, 5, 9, 13, 17 . . . 1021, etc.

Due to the interleaving of the blocks 38 among the memory banks 35, blocks 38 that indicate adjacent pixel rows are located in different banks 35. As a result, clock cycles otherwise needed for memory activation may be reduced, as described below. In this manner, a typical memory access (a read access, for example) may include an activation cycle which includes, among other things, precharging the memory cells to be accessed. Thus, the memory cells may not be accessed during the activation cycle, and as a result, the activation cycle extends the number of clock cycles needed to access the memory 26.

However, the activation cycle is not required for all memory accesses, a fact taken advantage of by the camera 20. For example, for column operations, the camera 20 operates on the columns of the image in sequence. In this manner, due to the interleaving of blocks 38, the subsets (subsets 37, as examples) of data for adjacent pixels of the same column are located in two different banks 35. Thus, because the location of the subset of data for the next column is always known for column operations, one bank 35 may be activated while another bank 35 is being accessed. As a result, the interleaving of the blocks 38 reduce the number of clock cycles needed for activating the bank 35.

As an example, for the first four pixels of the first column of pixels, the camera 20 might process subsets 37 (subsets 37a, 37b, 37c and 37d, as examples) of data from each one of the regions 33a, 33b, 33c and 33d, respectively. Because the regions 33a, 33b, 33c and 33d are located in different memory banks 35, the camera 20 may retrieve one subset 37 from one memory bank 35 while activating another memory bank 35 in preparation for the retrieval of another subset 37. Thus, for example, when retrieving the subset 37a (that corresponds to the first pixel of the first column of the pixel image) from the bank 35a, the camera 20 may simultaneously activate the memory bank 35b in preparation to retrieve the subset 37b (that corresponds to the second pixel of the first column zero of the pixel image).

Figure 8:
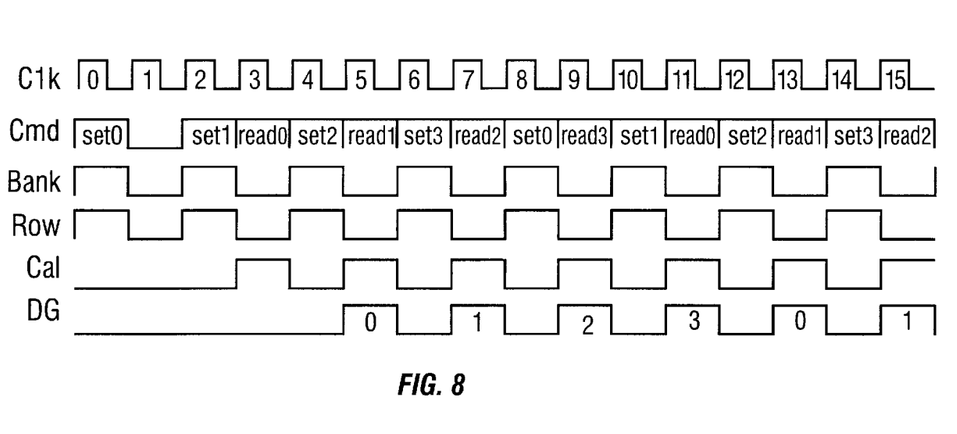
FIGS. 8, 9 and 10 are waveforms illustrating communications with the memory.
Figure 9:
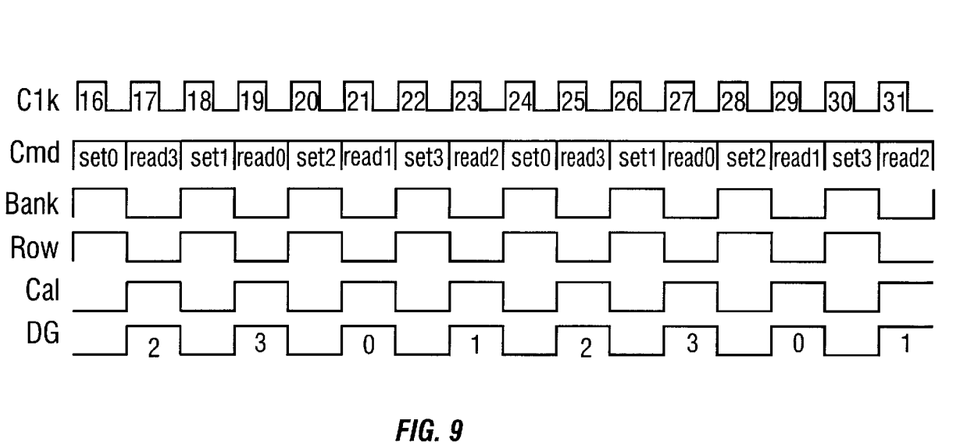

Referring to FIGS. 8 and 9, as an example of memory accesses that take advantage of the interleaving, the memory 26 may be clocked by a clock signal (called Clk) and receive commands via a command bus (represented by Cmd). The memory 26 may also receive a bank select signal (called Bank), a row select signal (called Row), and a column select signal (called Col); and may furnish a data output enable signal (called DQ). On the average, reading four bytes of data for four consecutive pixels of a given pixel column is accomplished in eight clock cycles, with the exception that the data for column zero takes nine clock cycles. As shown, as a result of the interleaving, every clock cycle (except for clock cycle one) of the command bus is utilized, and data is retrieved on every other clock cycle. As an example, in some embodiments, the average memory bandwidth for processing columns using the 2-D memory space 30 may be, for example, approximately 48.83 Mbytes/sec.

In some embodiments, the 2-D memory space 30 may be organized to utilize burst accesses. For example, the region 33 may be a contiguous region of a memory which facilitates the use of burst accesses to retrieve data from or store data in one of the regions 33. In a burst access, multiple bytes (eight, for example) of data from consecutive memory locations are transferred on consecutive clock cycles. As a result, the number of clock cycles needed for activation cycles are minimized. For example, referring to FIG. 10, for an exemplary burst read access, eight bytes of data are transferred using ten clock cycles, two of which are required to activate the appropriate memory cells.

Figure 11:
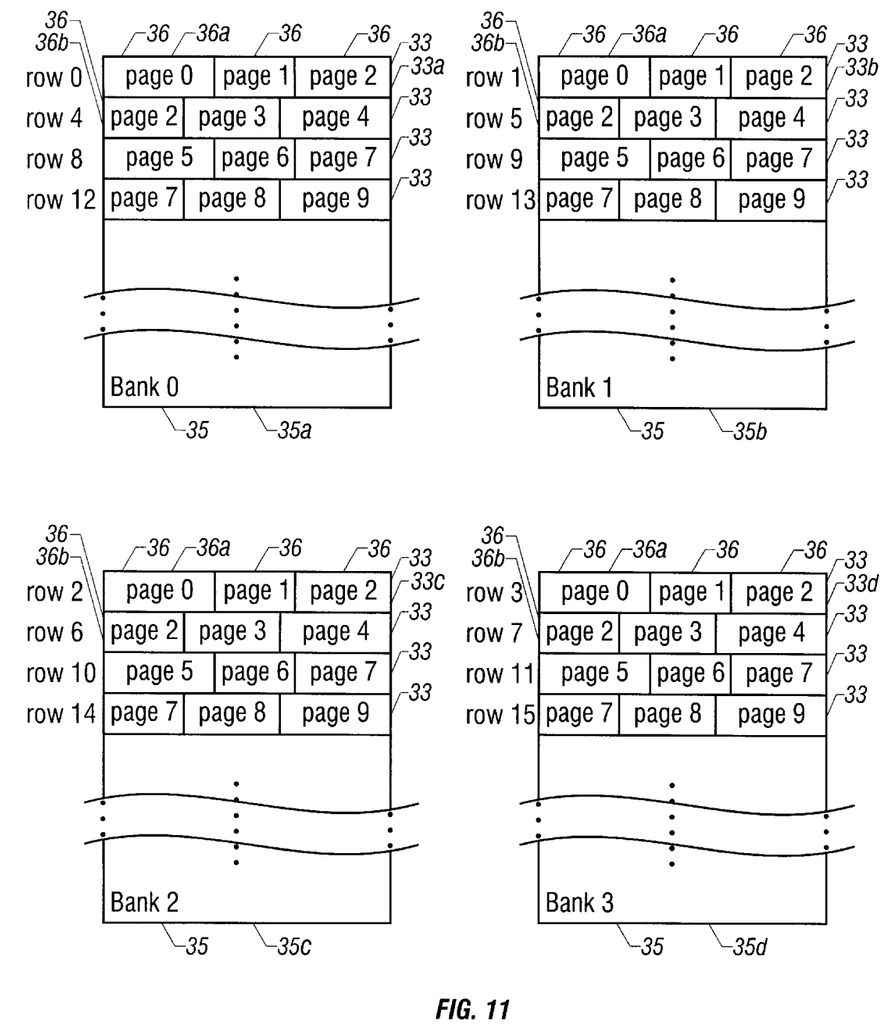
Figure 12:
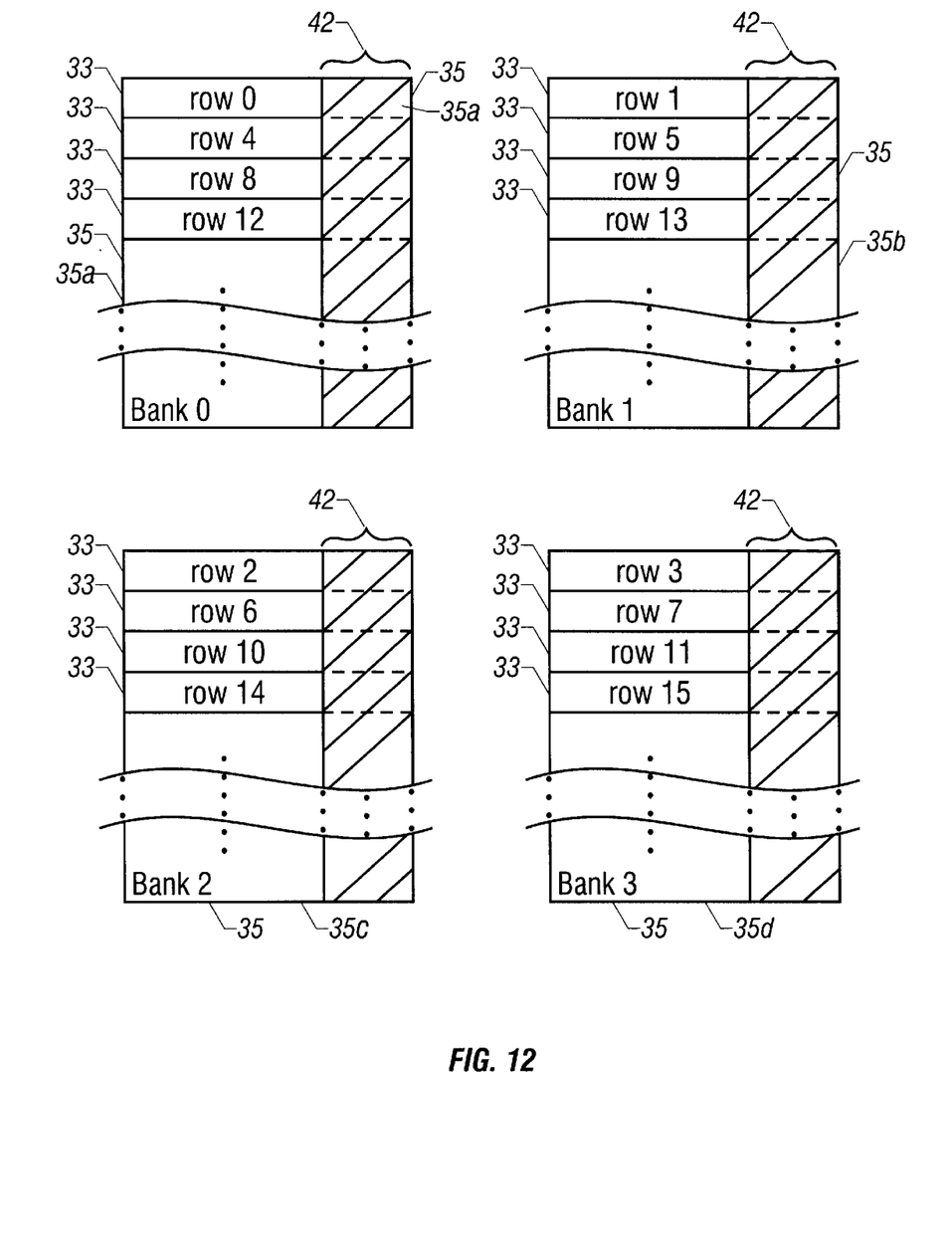

Burst access typically access memory cells that are located on a single row, or page, of the memory because the memory must first activate each new page before cells of that page are accessed. As a result, burst accesses typically do not accesses two different rows cross page boundaries in memory because another row of the memory cells typically has to be selected and thus, activated when the page boundary is crossed. As a result, additional cycles are consumed each time a new page is accessed. Referring to FIG. 11, as an example, if each row of the pixel image includes 1280 pixels, then 2.5 pages 36 of data may be stored in the region 33. As a result, two page boundaries are crossed to access all of the data in the region 33. Thus, taking into account page boundaries, the average bandwidth for processing rows may be, for example, approximately 98.2 Mbytes/sec, and taking into account the memory access times for both rows and columns, the average processing bandwidth may be, for example, approximately 73.5 Mbytes/sec.

Figure 10:
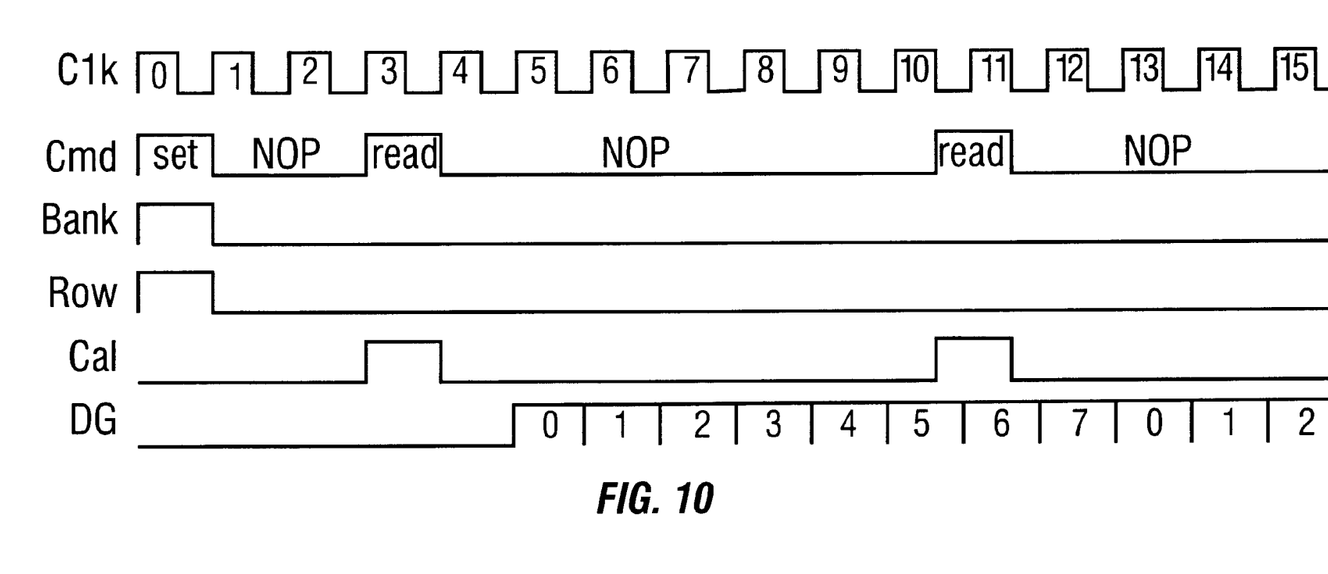

Referring to FIG. 10, because, in some embodiments, the size of the region 33 is constant, the entire region 33 may not always be used. For example, the region 33 may be large enough to store data for a row of 1280 pixels. However, for smaller pixel images, portions of the regions 33 may not be used, and as a result, a portion 42 of the 2-D memory space 30 may not be used.

The above-described situation may occur, for example, during 2-D compression when the camera 20 decomposes the original pixel image into smaller frequency sub-band images and further decomposes these frequency sub-band images into smaller sub-band images. As a result of these decompositions, the camera 20 stores successively smaller frames in the 2-D memory space 30, and eventually, for the smallest frames, the page size (512 bytes, for example) of the memory 26 might become substantially larger than each block 38 of the frame.

Figure 5:
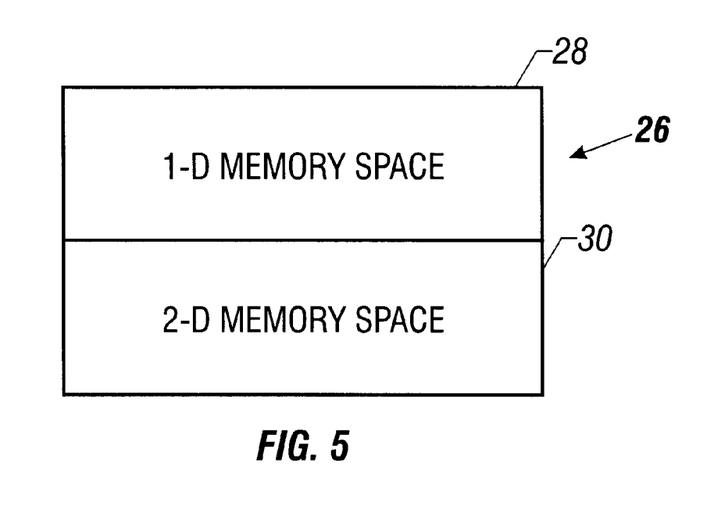
FIG. 5 is an illustration of memory spaces of a memory of the digital imaging system of FIG. 3.

Once the size of each block 38 becomes substantially smaller than the page size, the performance benefits gained from storing the blocks 38 in the 2-D memory space 30 may be negated i.e., the benefits gained from the techniques discussed above become negligible. Also, the storage (or retrieval) of the blocks 38 for these small images requires fewer memory operations than the storage (or retrieval) of the blocks 38 of the original frame. Thus, for these cases, in some embodiments, the camera 20 stores these small frames in a one-dimensional (1-D) memory space 28 (see FIG. 5) of the memory 26. Referring back to FIG. 7, the 1-D memory space 28 includes contiguous regions 39a, 39b, 39c and 39d, in the banks 35a, 35b, 35c and 35d, respectively, and the regions 39 may be linked in a head-to-tail fashion. In this manner, the blocks 38 may be successively stored one after another in the region 39a, and this linear storage sequence continues through the bank 35b, the bank 35c and the bank 35d, in that order.

Thus, in some embodiments, the memory 26 is split into the 1-D memory space 28 and the 2-D memory space 30. The 2-D memory space 30 may be used for 2-D operations when the size of the block 38 is substantially equal to or larger than the page size of the memory 26. The 1-D memory space 28 may be used for the other cases when the size of the block 38 is substantially less than the page size.

Figure 13:
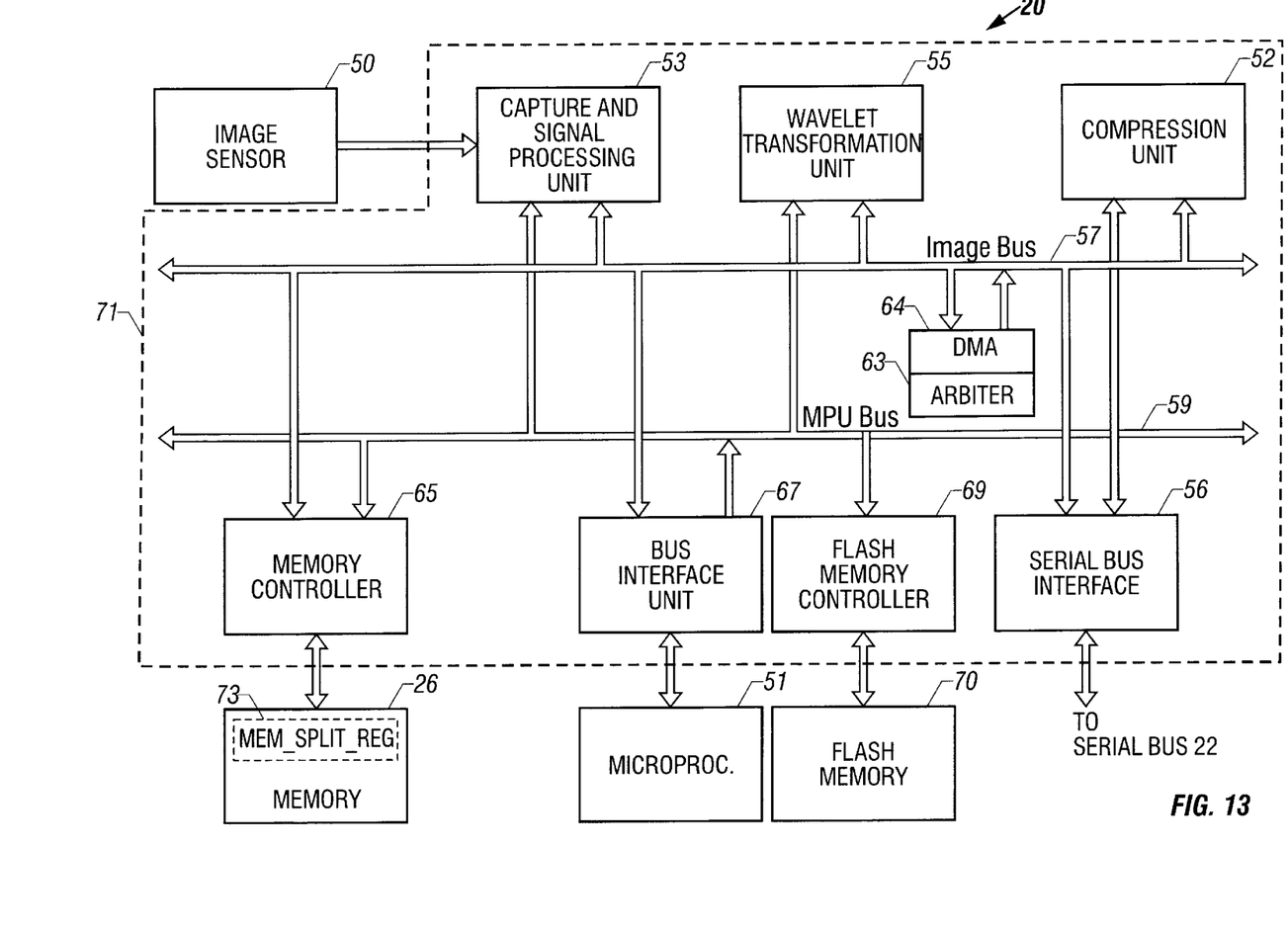
FIG. 13 is a block diagram of the camera of FIG. 3.

Referring to FIG. 13, the digital camera 20, in some embodiments, includes an image sensor 50 which electrically captures a pixel image of the optical image 21 (see FIG. 3) and stores the captured image as digital data. This digital data is transferred to a capture and signal processing unit 53 which, in turn, formats and stores the digital data in the 2-D memory space 30 to form the original, uncompressed frame.

In some embodiments, the original frame is retrieved from the memory 26 by a wavelet transformation unit 55 which processes the data of the original frame to decompose the original pixel image into frequency sub-band images. To accomplish this, the transformation unit 55 performs three passes, each of which produces four frequency sub-band images HH, HL, LH and LL.

In the initial pass, the transformation unit 55 spatially filters the original pixel image along a horizontal direction to create two intermediate images: one that represents the higher spatial frequency components of the original pixel image along the horizontal direction and the other that represents the lower spatial frequency components of the original pixel image along the horizontal direction. To perform this pass, the transformation unit 55 reads the data of original frame from the memory 26.

On the subsequent pass, the transformation unit 55 spatially filters the intermediate images to obtain the four frequency sub-band images HH, HL, LH and LL. Next, a compression unit 52 compresses the data associated with the frequency sub-band images HH, HL, and LH and stores the resultant compressed data in the memory 26. The LL frequency sub-band is used as an input image for the next pass, and as a result, the LL frequency sub-band is stored in the memory 26 without being compressed.

In the second and third passes, the transformation unit 55 uses the LL frequency sub-band image from the previous pass to generate another set of HH, HL, LH and LL frequency sub-band images. For the second pass, the compression unit 52 stores the compressed data for the HH, HL and LH frequency sub-band images in the memory 26. For the third pass, the compression unit 52 stores the compressed data for the HH, HL, LH and LL frequency sub-band images in the memory 26. Thus, the finally compressed frame includes data that indicates ten frequency sub-band images. As an example, the data for the first six frequency sub-band images may be stored in the 2-D memory space 30, and the data for the latter four frequency sub-band images may be stored in the 1-D memory space 28.

Thus, six read and write sequences occur with the memory 26 for a three pass decomposition. However, because of the use of the 1-D 28 and 2-D 30 memory spaces, a minimal number of memory cycles are required which permits relatively fast compression times.

A permanent copy of the finally compressed frame is stored in a flash memory 69 of the camera 20. The finally compressed frame may also be transferred from the flash memory 70 to the computer 24 via a serial bus 22 (a Universal Serial Bus (USB), for example).

The major communications channels within the camera 20 include an image bus 57 and a microprocessor unit (MPU) bus 59. The image bus 57 is used to transfer image pixel data between the different functional units of the camera 20, as all of these units may interact with the memory 26 via a memory controller 65 (which is coupled to the image bus 57). The image bus 57 is a multi-master bus, and ownership of the bus 57 is controlled by an arbiter 63. The control protocol for the image bus 57 is distributed among all of the functional units, i.e., the control protocol is implemented in every unit that is coupled to the image bus 57.

A direct memory access (DMA) controller 64 generates addresses for access to the memory 26, except for accesses initiated by a microprocessor 51. In this manner, to process a pixel image along the horizontal direction, a functional unit (the transformation unit 55, for example) may program registers of the DMA controller 64 with a type (read or write) of operation, a starting column number, the row number, the number of locations to access, and the direction (horizontal for this example) of the operation. Likewise, to process a pixel image along the vertical direction, one of the functional units may program registers of the DMA controller 64 with a type (read or write) of operation, a starting row number, the column number, the number of locations to access, and the direction (vertical for this example) of the operation.

The MPU bus 59 is used to transfer control, status and other programming information between the microprocessor 51 and other functional units of the camera 20. The microprocessor 51 may access the memory 26 via a bus interface unit 67 that is coupled to the MPU bus 59, the microprocessor 51 and the image bus 57. Similar to the DMA controller 64, the bus interface unit 67 generates the addresses for microprocessor accesses to both the 1-D 28 and 2-D 30 memory spaces.

Also coupled to the bus 57 is a serial bus interface 56 which, after the compression is complete, may interact with the memory controller 65 to retrieve (via the bus 57) the compressed frame from the memory 26. The serial bus interface 56 generates signals on a serial bus 22 to transfer the compressed frame to the computer 24 (see FIG. 2).

The addresses provided by the DMA controller 64 and the microprocessor 51 are converted by the memory controller 65 into signals to access the memory 26 for the linear and interleaved addressing, as described above. The memory controller 65 also handles burst mode control and bank interleaving. As example, the memory controller 65 may precharge the bank 35*b* when the bank 35*a* is being accessed and precharge the bank 35*c* when the bank 35*b* is being accessed. The partitioning of the memory 26 into the 1-D 28 and 2-D 30 memory spaces is controlled by a value stored in a memory address split register 73. The value stored in the register 73 is programmed by the microprocessor 51 which also initializes the arbiter 63, the DMA controller 64 and other functional units of the camera 20.

In some embodiments, all units of the camera 20 except for the image sensor 50, the memory 26, the microprocessor 51 and the flash memory 70 may be part of an image processing semiconductor chip 71. However, in other embodiments, the image sensor 50, the memory 26, the microprocessor 51 and the flash memory 70 may be fabricated with the other units on the same semiconductor chip.

Other combinations are possible and are within the scope of the following claims.

Other embodiments are within the scope of the following claims. For example, other imaging systems, such as a system that includes a graphics accelerator or a video processor may use 2-D memory space, as described above. As another example, blocks of data that indicate columns (instead of rows) of the image may be stored in an interleaved fashion among the memory banks.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A system comprising:
   memory banks to store data indicative of a pixel image, the image including lines of pixels; and
   a circuit to, for each pair of adjacent lines, store a first subset of the data indicative of a first line of the pair in one of the banks and store a second subset of the data indicative of the other line of the pair in another one of the banks.

2. The system of claim 1, wherein the circuit comprises: a compression unit to compress the data.

3. The system of claim 1, wherein the circuit comprises: a transformation unit to spatially filter the pixel image.

4. The system of claim 1, wherein the circuit comprises: a generator to generate addresses for storing the data in the banks.

5. The system of claim 1, wherein the lines comprise rows of pixels.

6. The system of claim 1, wherein the circuit further stores each of the subsets in a contiguous region of the respective bank.

7. The system of claim 1, wherein the circuit further stores the first and second subsets at common bank addresses of the respective banks.

8. The system of claim 1, wherein the memory banks and circuit are part of a camera.

9. A method comprising:
   storing data indicative of a pixel image in a memory; and
   interleaving blocks of the data among banks of the memory, each different block indicating a different line of the pixel image.

10. The method of claim 9, wherein the line comprises a row of the image.

11. The method of claim 9, wherein the line comprises a column of the image.

12. The method of claim 9, wherein the interleaving comprises:
    storing the blocks for adjacent lines of the image in different memory banks.

13. A system comprising:
    memory banks to store data indicative of a pixel image including lines of pixels, the banks collectively including a first region capable of storing, for each pair of adjacent lines, a first subset of the data indicative of a first line of the pair in one of the banks and storing a second subset of the data indicative of the other line of the pair in another one of the banks; and
    a circuit to selectively store the data in the first region based on a size of the data.

14. The system of claim 13, wherein the circuit further stores the data in the memory banks in a second region not including the first region if the size is below a predetermined threshold.

15. The system of claim 14, wherein the second region comprises a contiguous region that includes at least two of the memory banks.

16. The system of claim 14, wherein the second region is capable of storing the pairs in the same memory bank.

17. The system of claim 13, wherein the circuit further stores the data in the memory banks in the first region if the size is above the predetermined threshold.

18. The system of claim 13, wherein the lines comprise row of pixels.

19. A method for use with a pixel image, the image including lines of pixels, comprising:

for each pair of adjacent lines, storing a first subset of the data indicative of one of the lines of the pair in one of at least two banks of memory; and for each pair of adjacent lines, storing a second subset of the data indicative of the other line of the pair in another one of the banks.

20. The method of claim 19, further comprising:

storing each of the subsets in a contiguous region of the respective bank.

21. The method of claim 19, further comprising:

storing the first and second subsets at a common bank address of the respective banks.

22. A method for use with a pixel image including lines of pixels, comprising:

determining a size of the pixel image;

based on the size, for each pair of adjacent lines, selectively storing data indicative of the pair in a first region of a memory; and when the data is stored in the first region, storing a first subset of the data indicative of one of the lines of the pair in one memory bank and storing a second subset of the data indicative of the other line of the pair in another memory bank.

23. The method of claim 22, wherein the act of storing the data indicative of the pair includes storing the data in a second region of the memory not including the first region if the size is below a predetermined threshold.

24. The method of claim 22 herein the act of storing the data indicative of the pair includes storing the data in the first region of the memory if the size is above a predetermined threshold.

25. A system comprising:

a memory banks to store data indicative of a pixel image; and a circuit to interleave storage of the blocks of the data among the memory banks, each different block indicating a different line of the pixel image.

26. The system of claim 25, wherein the line comprises a row of the pixel image.

27. The system of claim 25, wherein the line comprises a column of the pixel image.

28. The system of claim 25, wherein the interleaving by the circuit includes storing the blocks of adjacent lines of the pixel image in different memory banks.

* * * * *